(12) United States Patent
Takei et al.

(10) Patent No.: US 12,034,598 B2
(45) Date of Patent: Jul. 9, 2024

(54) CONFIGURATION FEEDING DEVICE, CONFIGURATION FEEDING METHOD, AND CONFIGURATION FEEDING PROGRAM

(71) Applicant: Nippon Telegraph and Telephone Corporation, Tokyo (JP)

(72) Inventors: Yuki Takei, Musashino (JP); Satoshi Nakatsukasa, Musashino (JP); Yuta Watanabe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/276,922

(22) PCT Filed: Feb. 16, 2021

(86) PCT No.: PCT/JP2021/005766
§ 371 (c)(1),
(2) Date: Aug. 11, 2023

(87) PCT Pub. No.: WO2022/176032
PCT Pub. Date: Aug. 25, 2022

(65) Prior Publication Data
US 2024/0121152 A1  Apr. 11, 2024

(51) Int. Cl.
*H04L 41/084* (2022.01)
*H04L 12/46* (2006.01)
*H04L 41/0806* (2022.01)

(52) U.S. Cl.
CPC ...... *H04L 41/0843* (2013.01); *H04L 12/4633* (2013.01); *H04L 41/0806* (2013.01)

(58) Field of Classification Search
CPC ............. H04L 12/4633; H04L 41/0806; H04L 41/0843
See application file for complete search history.

(56) References Cited

U.S. PATENT DOCUMENTS 9,900,238 B2 * 2/2018 Kang ...................... H04L 45/74
10,225,103 B2 * 3/2019 Tumuluru ........... H04L 12/4641
(Continued)

FOREIGN PATENT DOCUMENTS

JP          2014532368    12/2014
WO   WO 2016117697     7/2016

OTHER PUBLICATIONS

Farinacci et al., "Generic Routing Encapsulation (GRE)," Network Working Group Request for Comments: 2784, Mar. 2000, 9 pages.
(Continued)

*Primary Examiner* — George C Neurauter, Jr.
(74) *Attorney, Agent, or Firm* — Fish & Richardson P.C.

(57) ABSTRACT

When a controller receives a tunnel setting order from a high-order Ops (operation system), the controller divides the setting order into a first setting processing step related to setting registration of a user, a second setting processing step related to a transfer surface of the tunnel, a third setting processing step related to an interface of each transfer apparatus used for a tunnel of the transfer surface, and a fourth setting processing step related to a parameter to be set to the interface and stores the setting processing steps in a setting management DB. Subsequently, the controller creates a configuration for executing each setting processing step indicated in the tunnel setting order by reflecting information indicated in each divided setting processing step to a template of each setting processing step. In addition, the controller inputs the created configuration to a transfer apparatus at a setting destination of the tunnel.

6 Claims, 12 Drawing Sheets

(56) References Cited

U.S. PATENT DOCUMENTS

| | | |
|---|---|---|
| 11,563,601 B1* | 1/2023 | K S .................... H04L 41/0816 |
| 11,929,925 B2* | 3/2024 | Dutta ...................... H04L 45/74 |
| 2014/0219135 A1 | 8/2014 | Li et al. |
| 2015/0381494 A1* | 12/2015 | Cherian ................. H04L 69/22 |
| | | 370/392 |
| 2017/0063783 A1* | 3/2017 | Yong ...................... H04L 69/22 |
| 2018/0004576 A1 | 1/2018 | Gokurakuji et al. |

OTHER PUBLICATIONS

Simpson, "IP in IP Tunneling," Network Working Group Request for Comments: 1853, Oct. 1995, 8 pages.

* cited by examiner

Fig. 7

| APPARATUS ID | MODEL | VERSION OF OS | TYPE OF APPLICABLE TUNNEL | RESOURCE UPPER LIMIT | | | CONSUMED RESOURCES | | |
|---|---|---|---|---|---|---|---|---|---|
| | | | | USER | TUNNEL | ... | USER | TUNNEL | ... |
| #1 | aaa | xx.xx | XXX/YYY | 100 | 200 | | 30 | 50 | |

CONFIGURATION FEEDING DEVICE, CONFIGURATION FEEDING METHOD, AND CONFIGURATION FEEDING PROGRAM

CROSS-REFERENCE TO RELATED APPLICATIONS

This application is a National Stage application under 35 U.S.C. § 371 of International Application No. PCT/JP2021/005766, having an International Filing Date of Feb. 16, 2021, the disclosure of which is considered part of the disclosure of this application, and is incorporated by reference in its entirety into this application.

TECHNICAL FIELD

The present invention relates to a configuration input apparatus, a configuration input method, and a configuration input program.

BACKGROUND ART

Conventionally, when a network controller receives a setting order of a tunnel of a certain user, a configuration with respect to a tunnel start point apparatus and an end point apparatus of the user is created based on the setting order and the configuration is input.

CITATION LIST

Non Patent Literature

[NPL 1] IP in IP tunneling, [Retrieved on Jan. 29, 2021], Internet <URL: https://tools.ietf.org/html/rfc1853>
[NPL 2] Generic Routing Encapsulation (GRE), [Retrieved on Jan. 29, 2021], Internet <URL: https://tools.ietf.org/html/rfc2784>

SUMMARY OF INVENTION

Technical Problem

However, when creating a configuration in order to set a tunnel for each user and each apparatus, an enormous amount of setting patterns are generated and, consequently, the creation and management of configurations become complicated. In consideration thereof, an object of the present invention is to solve the problem described above and to facilitate creation and management of configurations for tunnel setting to each apparatus of a network.

Solution to Problem

In order to solve the problem described above, the present invention includes: an order receiving unit which receives a setting order of a tunnel; an order dividing unit which divides the setting order of a tunnel into a first setting processing step related to setting registration of a user, a second setting processing step related to a transfer surface of the tunnel, a third setting processing step related to an interface of each transfer apparatus used for a tunnel of the transfer surface, and a fourth setting processing step related to a parameter to be set to the interface and which stores the divided setting processing steps in a storage unit; a setting processing unit which creates a configuration for executing setting processing of the tunnel as indicated in the setting order by reflecting information indicated in each setting processing step on a template prepared for each setting processing step; and a configuration input unit which inputs the configuration to a transfer apparatus at a setting destination of the tunnel.

Advantageous Effects of Invention

According to the present invention, the creation and management of configurations for tunnel setting to each apparatus of a network can be facilitated.

BRIEF DESCRIPTION OF DRAWINGS

FIG. 7 is a diagram showing an example of apparatus information stored in an apparatus information DB shown in FIG. 2.

DESCRIPTION OF EMBODIMENTS

Hereinafter, a mode for carrying out the present invention (an embodiment) will be described with reference to the drawings. It should be noted that the present invention is not limited to the embodiment described below.

[Transfer Apparatus and Controller]

First, referring to FIG. 1, transfer apparatuses 40 to be an object of input of a configuration by a controller 10 and the controller 10 will be described.

Figure 1:
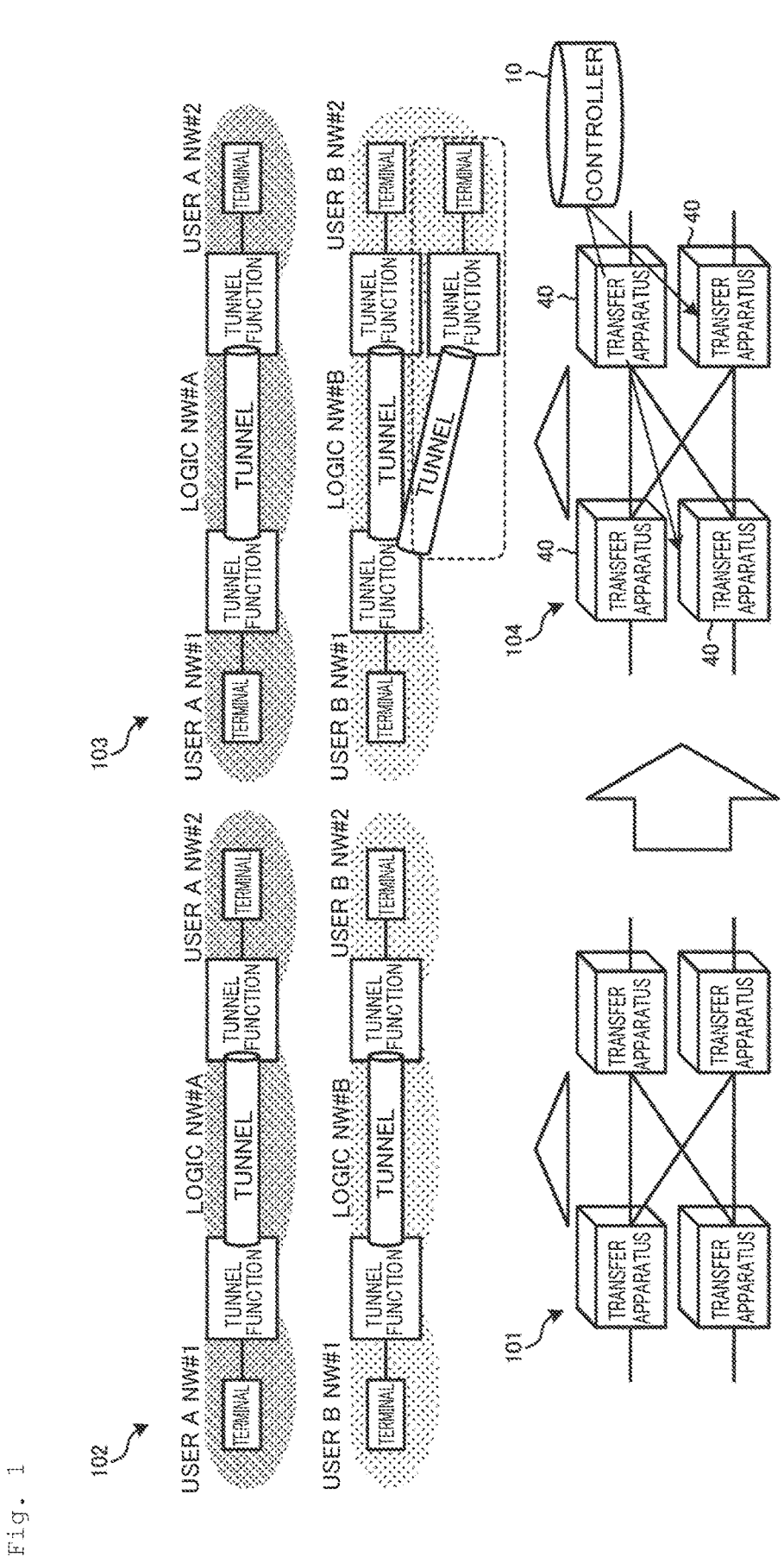
FIG. 1 is a diagram showing an example of a network made up of transfer apparatuses.

The transfer apparatuses 40 are apparatuses which transfer data on L2 (layer 2) or L3 (layer 3) and which are communicably connected via a network (refer to reference sign 101 in FIG. 1). Each of the transfer apparatuses 40 has a tunnel function, and when a tunnel is set with another transfer apparatus 40, performs data transfer using the tunnel. In the following description, the tunnel may be an L3 tunnel or an L2 tunnel.

For example, as indicated by reference sign 102 in FIG. 1, NW #1 and NW #2 of user A are connected by a tunnel set between the transfer apparatuses 40 (logic NW #A). In addition, for example, NW #1 and NW #2 of user B are also connected by a tunnel set between the transfer apparatuses 40 (logic NW #B).

Now, let us consider a case where a tunnel is added to the logic NW #B as indicated by reference sign 103 due to, for example, an increase in a communication volume between NW #1 and NW #2 of user B. In this case, the controller 10 of the transfer apparatuses 40 inputs a configuration for adding a tunnel to the transfer apparatuses 40 constituting the logic NW #B as indicated by reference sign 104.

[Configuration Example of System]

Next, a configuration example of a system including the controller 10 will be described with reference to FIG. 2. A system 1 includes, for example, the controller 10, a real-time information DB (database) 20, an external information collection system 30, and transfer apparatuses 40 (40 *a*, 40 B, . . . , 40 N).

The controller 10 is an apparatus which controls each of the transfer apparatuses 40. For example, when a setting order of a tunnel between transfer apparatuses 40 is received from a high-order Ops (operation system), the controller 10 refers to information collected from the real-time information DB 20, the external information collection system 30, and the like and creates a configuration for setting the tunnel. Subsequently, the controller 10 inputs the created configuration to the transfer apparatus 40 at a tunnel setting destination.

The real-time information DB 20 stores information indicating a communication state between the transfer apparatuses 40. The information indicating the communication state between the transfer apparatuses 40 is information indicating, for example, a communication delay time, jitter, or a communication band between the transfer apparatuses 40. The information in the real-time information DB 20 is updated, for example, every predetermined period.

The external information collection system 30 collects information on a communication state (for example, a communication delay time, jitter, or a communication band) between the transfer apparatuses 40. For example, the external information collection system 30 collects information on a communication state between designated transfer apparatuses 40 based on a request from the controller 10 and outputs the information to the controller 10.

[Controller]

The controller 10 includes a setting unit 11 and an apparatus determining unit 12. The setting unit 11 creates a configuration for tunnel setting and inputs the configuration to the transfer apparatus 40 at a tunnel setting destination. The apparatus determining unit 12 determines the transfer apparatus 40 to which the configuration is to be input by the setting unit 11 based on information indicating a communication state between the transfer apparatuses 40, a communication requirement of a user of the tunnel (user requirement), and the like.

[Setting Unit]

The setting unit 11 includes an order receiving unit 111, an order dividing unit 112, a setting management DB 113, a template DB 114, a setting processing unit 115, and a configuration input unit 116. The setting management DB 113 and the template DB 114 are provided in a storage unit (not shown) of the controller 10.

Figure 3:
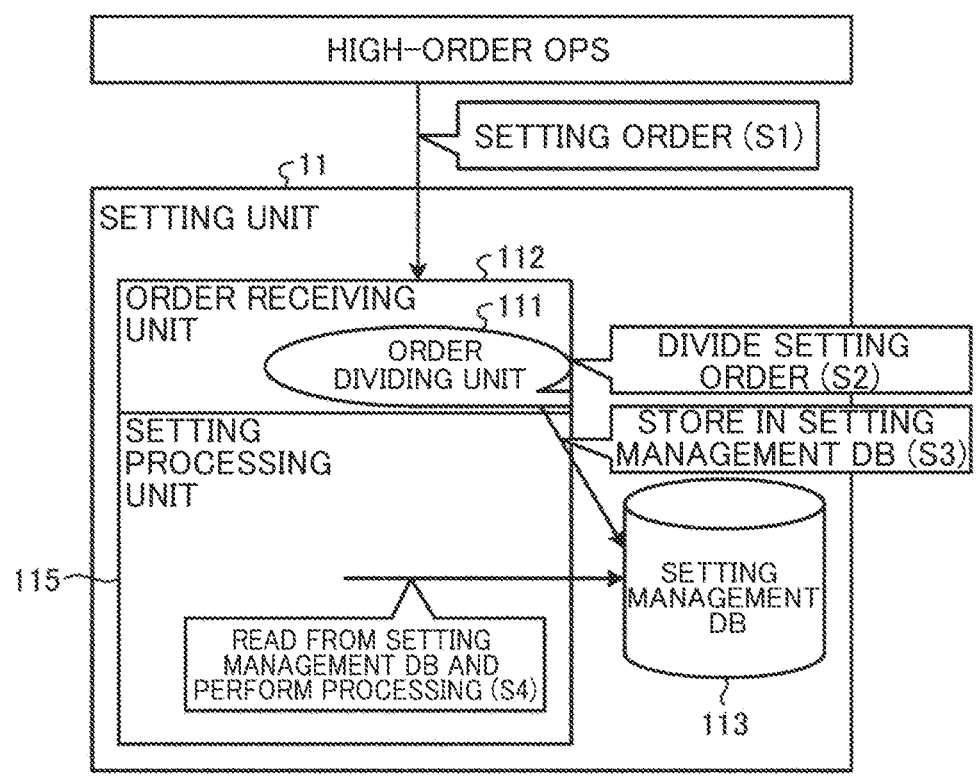
FIG. 3 is a diagram for providing an overview of a setting unit shown in FIG. 2.

First, an overview of the setting unit 11 will be provided with reference to FIG. 3. As shown in FIG. 3, the order receiving unit 111 of the setting unit 11 receives a tunnel setting order from, for example, a high-order Ops (S1). Subsequently, the order dividing unit 112 divides the setting order received in S1 (S2) and stores the divided setting order in the setting management DB 113 (S3). Subsequently, the setting processing unit 115 reads the setting processing from the setting management DB 113 and performs the setting processing (S4).

Returning to FIG. 2, the setting unit 11 will be described in detail. The order receiving unit 111 of the setting unit 11 receives a setting order of a tunnel. The setting order of a tunnel includes, for example, any of the setting processing steps described in (1) to (4) below or a combination thereof.

(1) Set new registration or delete registration of a user of the tunnel (2) Set new transfer surface or delete transfer surface using the tunnel (3) Set new interface, delete interface, or change setting of interface of the tunnel (4) Change setting of parameters which paralyze each set interface In the setting order, the information related to the setting processing step of (1) includes, for example, an ID of a user. In addition, the information related to the setting processing step of (2) includes, for example, a type of a transfer surface (for example, L3 or L2) and information (for example, an apparatus ID of the transfer apparatus 40) on an apparatus used on the transfer surface. Furthermore, the information related to the setting processing step of (3) includes, for example, information such as a type of a tunnel and an IP address of an interface used in the tunnel. In addition, the information related to the setting processing step of (4) includes, for example, a parameter type (for example, BGP (Border Gateway Protocol), QoS (Quality of Service), or an end point address) and a parameter value of parameters to be setting objects.

The order dividing unit 112 divides the setting order received by the order receiving unit 111 into predetermined units of setting processing steps. For example, the order dividing unit 112 divides the setting order into the setting processing steps shown in (1) to (4) above. Subsequently, the order dividing unit 112 stores the divided setting processing steps in the setting management DB 113.

Figure 4:
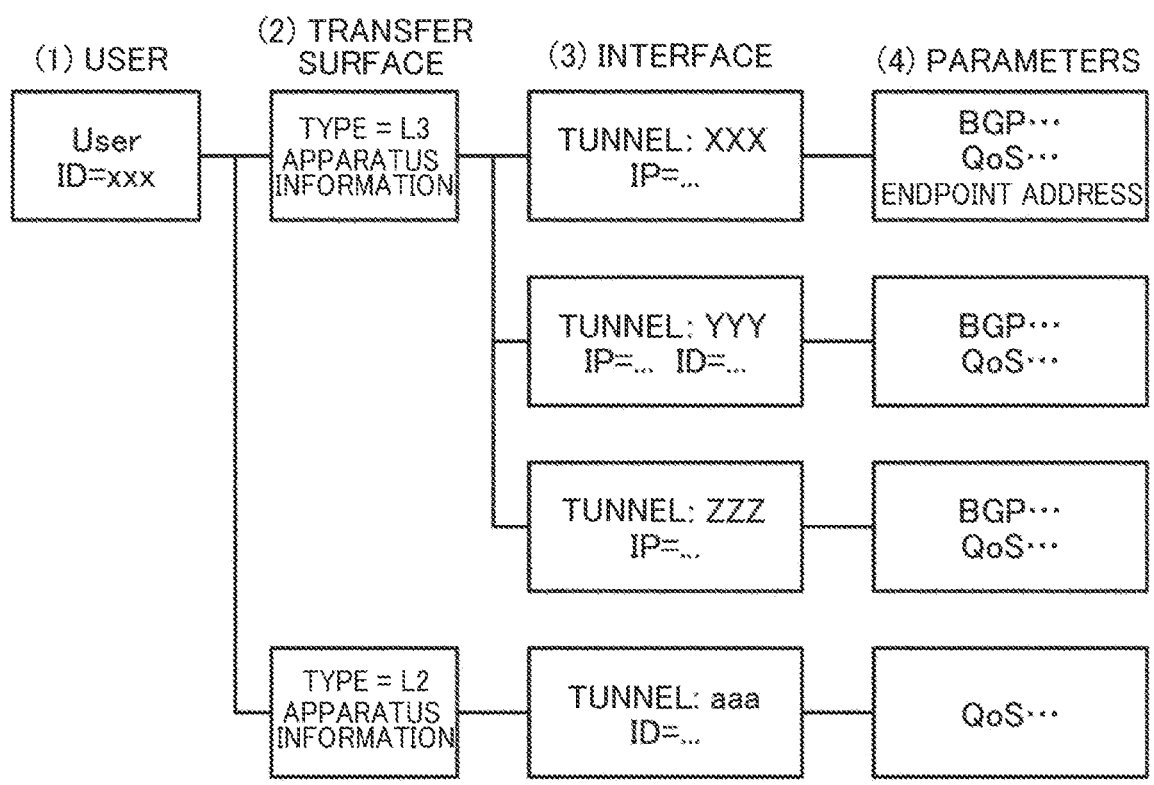
FIG. 4 shows an example of setting processing stored in a setting management DB shown in FIG. 2.

For example, the order dividing unit 112 divides the setting order into the setting processing steps shown in (1) to (4) above as shown in FIG. 4, makes mutually-related setting processing steps into a tree structure, and stores the tree structure in the setting management DB 113.

For example, as shown in FIG. 4, the tree structure is connected from top to bottom in an order of (1) setting processing step related to users→(2) setting processing step related to transfer surfaces→(3) setting processing step related to interfaces→(4) setting processing step related to parameters.

Figure 2:
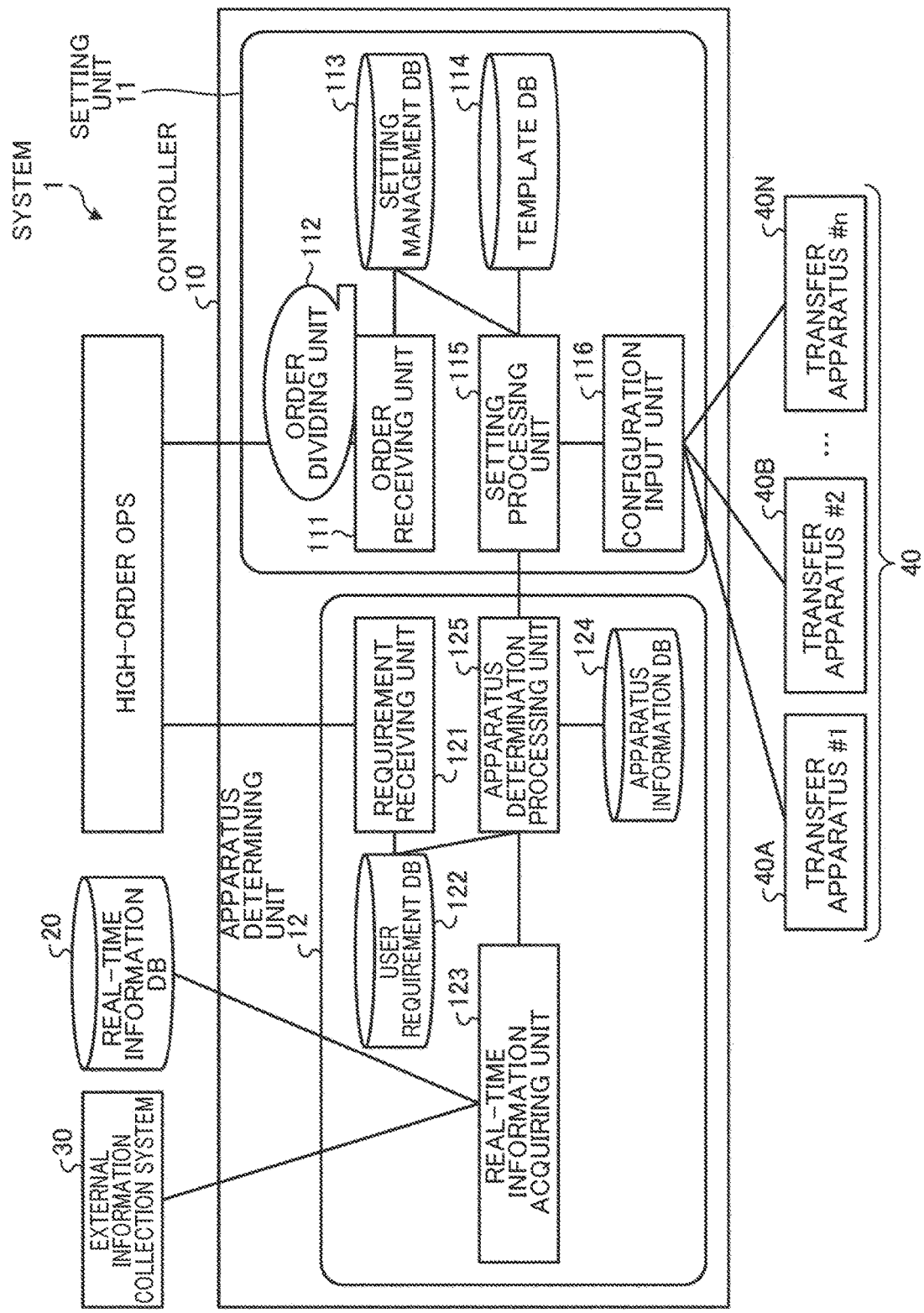
FIG. 2 is a diagram showing a configuration example of a system including a controller.

Let us return to the description of FIG. 2. The setting management DB 113 stores setting orders (refer to FIG. 4) divided into units of setting processing steps by the order dividing unit 112.

The template DB 114 stores a template for executing each setting processing step stored in the setting management DB 113. For example, the template DB 114 stores templates for sequentially executing the setting processing steps of (1) to (4) described above.

The setting processing unit 115 creates a configuration for executing the setting processing shown in the setting order by reflecting information shown in each setting processing step divided by the order dividing unit 112 on a template for executing the setting processing step read from the template DB 114.

For example, the setting processing unit 115 creates the configuration by sequentially reflecting elements from the top of the tree (refer to FIG. 4) of each divided setting processing step to the template having been read from the template DB 114 and which corresponds to the setting processing steps of (1) to (4) described above.

Figure 5:
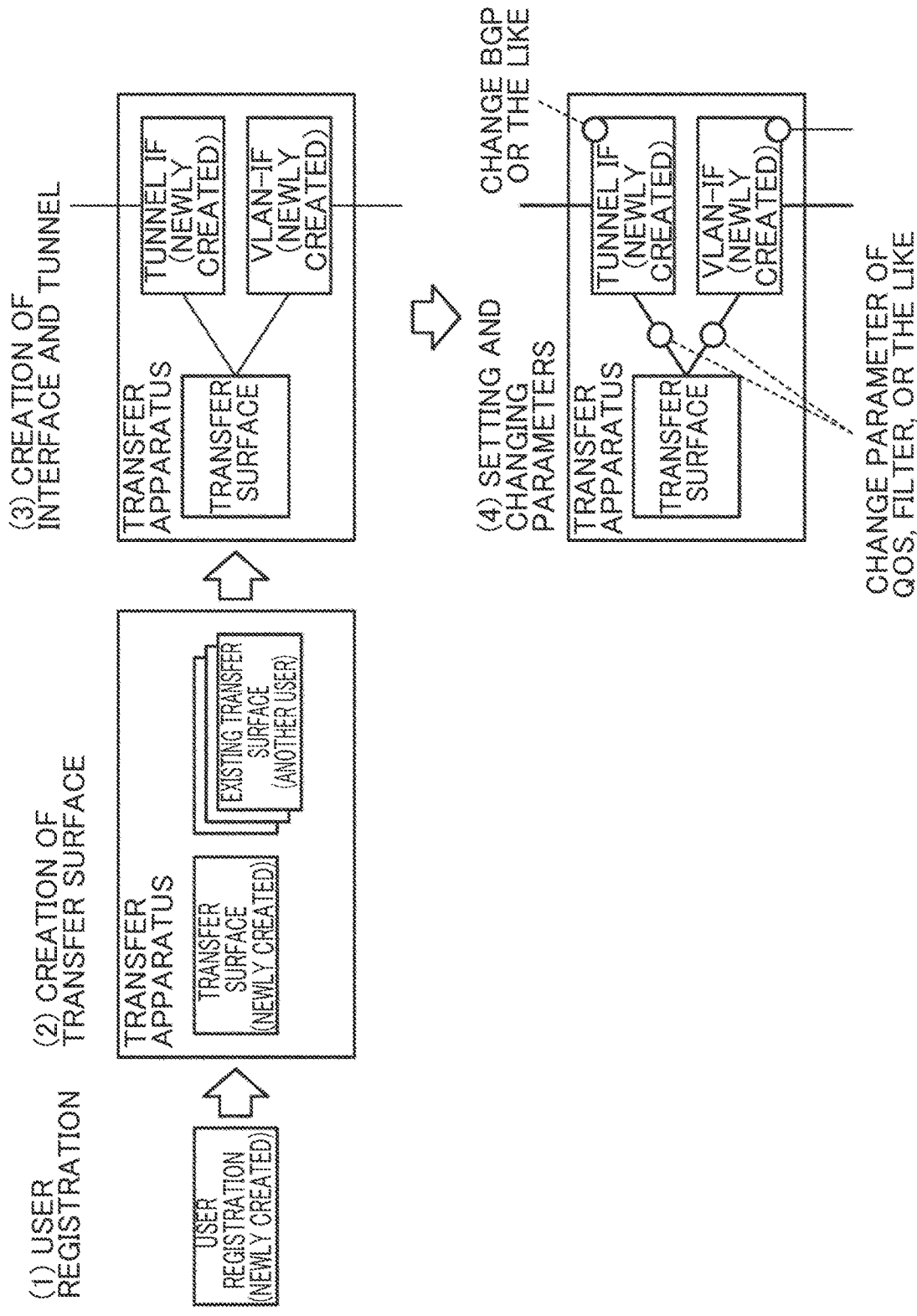
FIG. 5 is a diagram for explaining a template used by the controller shown in FIG. 2.

For example, as shown in FIG. 5, the setting processing unit 115 creates a configuration for executing settings in an order of (1) processing of user registration→(2) processing of new creation of a transfer surface→(3) processing of creation of an interface and a tunnel→(4) processing of setting and changing parameters.

The creation of an interface in (3) is, for example, the creation of a tunnel IF and a VLAN-IF. Furthermore, the processing of setting and changing parameters in (4) includes, for example, changing BGP or the like and changing parameters such as a QoS and a filter.

In addition, the setting processing unit 115 requests the apparatus determining unit 12 to determine the transfer apparatus 40 (setting apparatus) at an input destination of the configuration.

For example, the setting processing unit 115 outputs a determination request of a setting apparatus including parameters included in the setting order of a tunnel to the apparatus determining unit 12. For example, the parameters include a user ID, a type of a tunnel, a set amount (for example, a band used for a tunnel), an apparatus ID or an IP address of the transfer apparatus 40 being a candidate for setting a tunnel, and network information of a connection destination of the transfer apparatus 40. For example, contents of the setting processing steps read from the setting management DB 113 by the setting processing unit 115 may be used as the parameters.

In addition, when receiving a determination result of the transfer apparatus 40 at the input destination of the configuration from the apparatus determining unit 12, the setting processing unit 115 requests the configuration input unit 116 to input the configuration to the transfer apparatus 40. The configuration input unit 116 inputs the configuration to the transfer apparatus 40 based on the request from the setting processing unit 115.

[Apparatus Determining Unit]

Next, the apparatus determining unit 12 will be described. The apparatus determining unit 12 includes a requirement receiving unit 121, a user requirement DB 122, a real-time information acquiring unit 123, an apparatus information DB 124, and an apparatus determination processing unit 125. The user requirement DB 122 and the apparatus information DB 124 are provided in a storage unit (not shown) of the controller 10.

Figure 6:
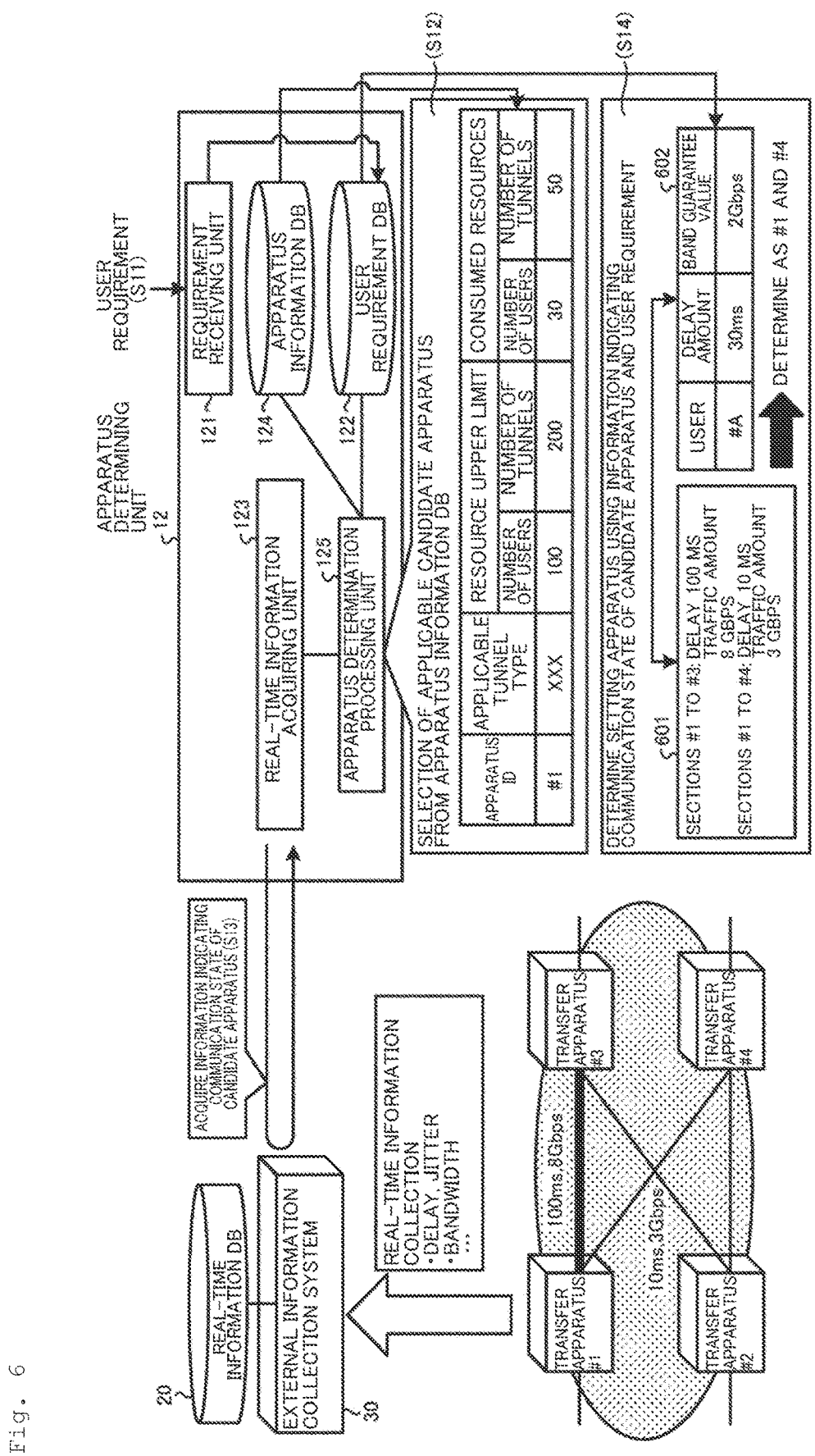
FIG. 6 is a diagram for providing an overview of an apparatus determining unit shown in FIG. 2.

First, an overview of the apparatus determining unit 12 will be provided with reference to FIG. 6. As shown in FIG. 6, when the requirement receiving unit 121 of the apparatus determining unit 12 receives a user requirement (a communication requirement of the user), the requirement receiving unit 121 stores the user requirement in the user requirement DB 122 (S11).

After S11, when the apparatus determination processing unit 125 receives a determination request of a setting apparatus including the parameters described above from the setting processing unit 115 (refer to FIG. 2), the apparatus determination processing unit 125 selects applicable candidate apparatuses (transfer apparatuses 40 to be candidates of the setting apparatus) from the apparatus information DB 124 (S12).

For example, the apparatus determination processing unit 125 selects candidate apparatuses based on the parameters described above, a type of tunnel to which each transfer apparatus 40 shown in the apparatus information DB 124 is applicable, and a resource state (for example, a resource upper limit amount or a consumed resource).

After S12, the real-time information acquiring unit 123 acquires information indicating a communication state of the candidate apparatuses selected in S12 from the real-time information DB 20 or the external information collection system 30 (S13).

For example, when the candidate apparatuses are the transfer apparatuses #1 to #4 shown in FIG. 6, the real-time information acquiring unit 123 acquires information such as a delay, jitter, a band of communication, or the like among the respective transfer apparatuses #1 to #4.

After S13, the apparatus determination processing unit 125 determines, using information indicating a communication state of the candidate apparatuses and a user requirement, a setting apparatus from the candidate apparatuses selected in S12 (S14).

For example, using information indicating communication states of candidate apparatuses indicated by reference sign 601 and the user condition indicated by reference sign 602, the apparatus determination processing unit 125 determines the transfer apparatus #1 and the transfer apparatus #4 satisfying the user condition as setting apparatuses from among the transfer apparatuses #1 to #4. In addition, the apparatus determination processing unit 125 outputs information on the determined transfer apparatuses #1 and #4 to the setting processing unit 115.

Returning to FIG. 2, the apparatus determining unit 12 will be described in detail. When the requirement receiving unit 121 of the apparatus determining unit 12 receives an input of a user requirement, the requirement receiving unit 121 stores the user requirement in the user requirement DB 122. The user requirement DB 122 stores the user requirement. A user requirement is information indicating a communication requirement of each user. For example, the user requirement is information indicating, for each user, a delay amount (delay time), a band guarantee value (band to be guaranteed), and the like allowed for communication of the user as indicated by reference sign 602 in FIG. 6.

The real-time information acquiring unit 123 acquires information indicating a communication state between the transfer apparatuses 40. For example, the information indicating the communication state between the transfer apparatuses 40 is information indicating a delay time, a traffic amount, and the like for each section connecting the transfer apparatuses 40 as indicated by reference sign 601 in FIG. 6. For example, the information is acquired in real time from each transfer apparatus 40.

The apparatus information DB 124 stores the apparatus information of each transfer apparatus 40. The apparatus information is information indicating an allocated resource amount and a consumed resource amount of the transfer apparatus 40.

As shown in FIG. 7, for example, the apparatus information is information indicating an apparatus ID, a model, a version of an OS (Operating System), a type of an applicable tunnel, a resource upper limit amount, a consumed resource, and the like.

The resource upper limit amount is information indicating, for example, an upper limit value of the number of users of the tunnel, an upper limit value of the number of tunnels, and the like which can be set to the transfer apparatus 40. Furthermore, the consumed resource amount is information indicating, for example, the number of users of the tunnel, the number of tunnels, and the like set to the transfer apparatus 40.

Let us now return to the description of FIG. 2. The apparatus determination processing unit 125 determines a setting apparatus based on a determination request of a setting apparatus output from the setting processing unit 115. The determination request of a setting apparatus includes parameters included in the setting order of a tunnel. For example, contents shown in each setting processing step read from the setting management DB 113 by the setting processing unit 115 are used as the parameters.

As described earlier, for example, the parameters include a user ID, a type of a tunnel, a set amount, an apparatus ID or an IP address of the transfer apparatus 40 as a tunnel setting candidate, network information of a connection destination, and the like.

For example, the apparatus determination processing unit 125 determines a transfer apparatus 40 satisfying the communication requirement of the user from among the transfer apparatuses 40 being tunnel setting candidates described above as a setting apparatus based on user IDs included in the parameters described above and the transfer apparatuses 40 that are tunnel setting candidates, the allocated resource amount and the consumed resource amount of each transfer apparatus 40 indicated in apparatus information in the apparatus information DB 124, and information indicating a communication state between the transfer apparatuses 40 collected by the real-time information acquiring unit 123. Subsequently, the apparatus determination processing unit 125 outputs the transfer apparatus 40 determined as the setting apparatus to the setting processing unit 115.

According to the controller 10 described above, since the setting order of a tunnel is divided into a plurality of setting processing steps and a configuration is created using templates, the configuration can be readily created. In addition, the controller 10 stores the divided setting processing steps in the setting management DB 113 in, for example, a tree structure. Accordingly, a configuration can be more readily managed, partially modified, or expanded.

Furthermore, the controller 10 uses the communication state among the respective transfer apparatuses 40 to determine a transfer apparatus 40 satisfying the communication requirement of a user as an input destination of the configuration. Accordingly, the controller 10 can flexibly determine the transfer apparatus 40 at a setting destination of a tunnel according to the communication state among the transfer apparatuses 40.

[Example of Processing Procedure]

Figure 8:
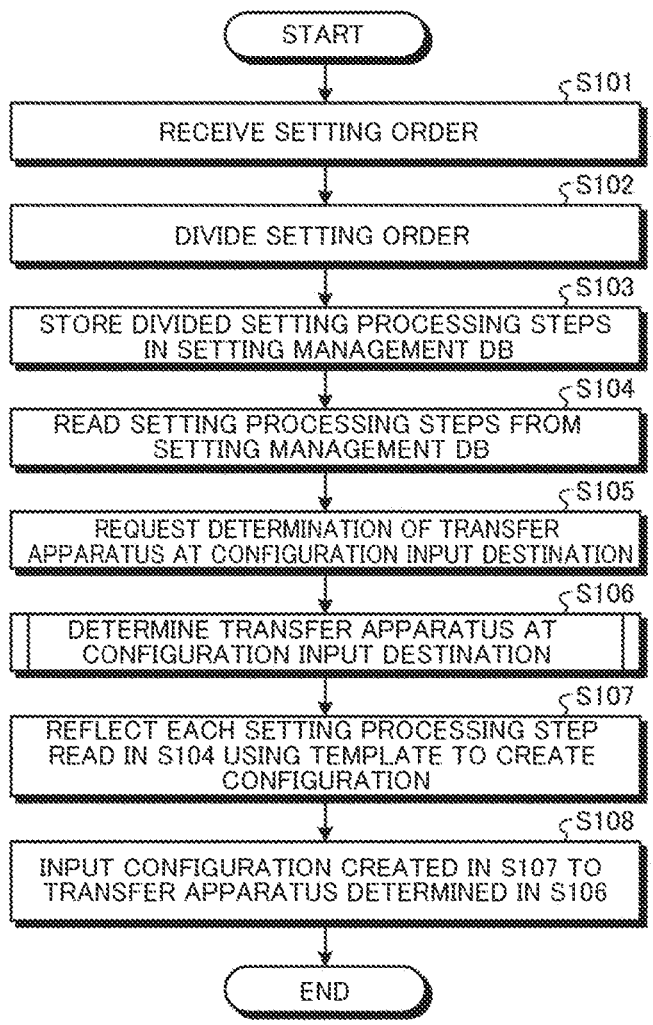
FIG. 8 is a flowchart showing an example of a processing procedure of the controller shown in FIG. 2.

Next, an example of a processing procedure of the controller 10 will be described with reference to FIG. 8. For example, first, the order receiving unit 111 of the controller 10 receives a tunnel setting order from a high-order Ops (S101). Next, the order dividing unit 112 divides the setting order received in S101 into a plurality of setting processing steps (S102: division of setting order). Subsequently, the order dividing unit 112 stores the divided setting processing steps in the setting management DB 113 (S103).

After S103, the setting processing unit 115 reads setting processing steps from the setting management DB 113 (S104). In addition, the setting processing unit 115 requests the apparatus determining unit 12 to determine the transfer apparatus 40 (setting apparatus) at an input destination of a configuration (S105).

After S105, the apparatus determining unit 12 determines the transfer apparatus 40 at the input destination of a configuration based on the request (S106). Details of the processing in S106 will be described later. Subsequently, the setting processing unit 115 creates a configuration reflecting the setting processing steps read in S104 using a template of the template DB 114 (S107). Subsequently, the configuration input unit 116 inputs the configuration created in S107 to the transfer apparatus 40 determined in S106 (S108).

Figure 9:
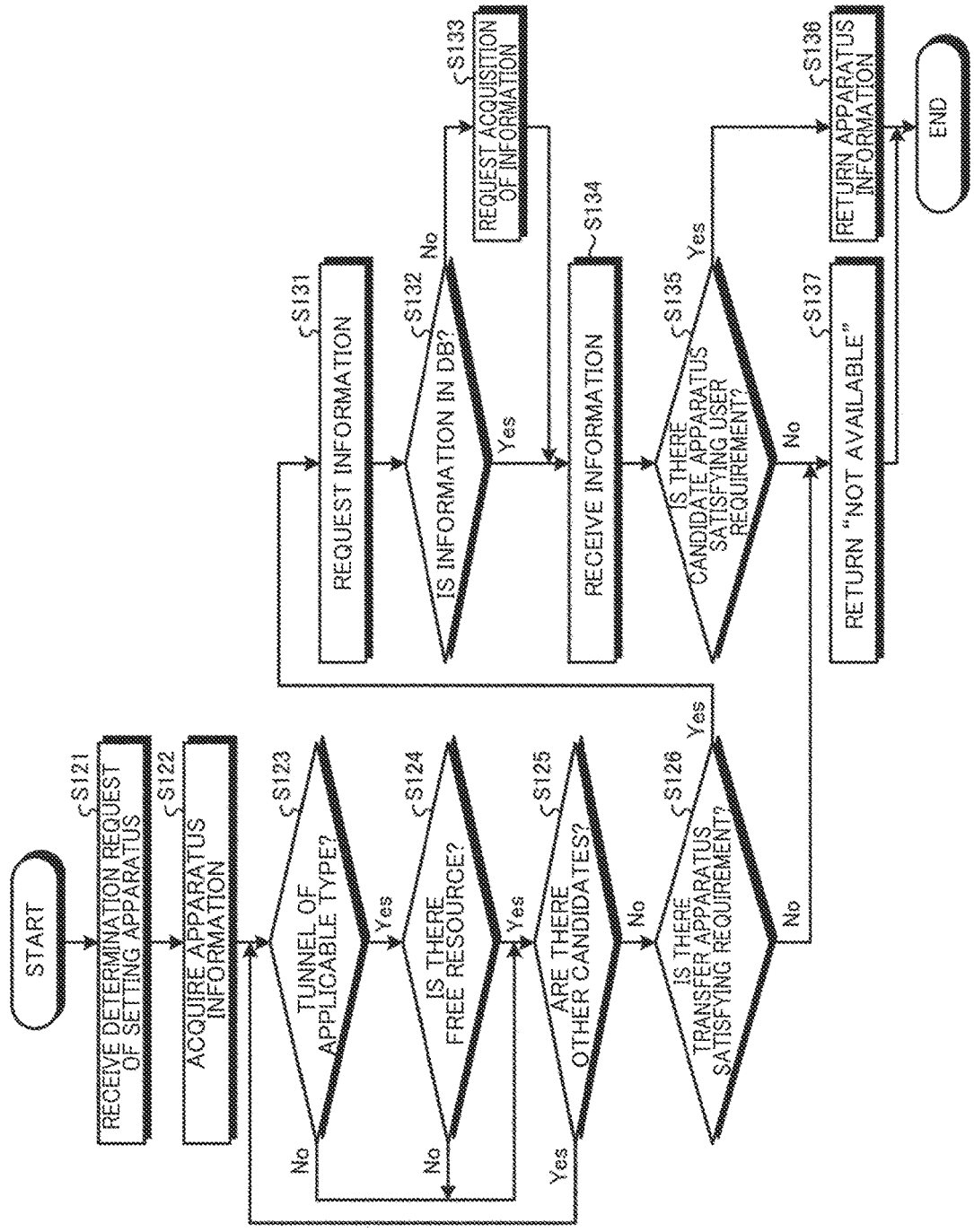
FIG. 9 is a flowchart showing an example of a processing procedure of S106 in FIG. 8.

Next, S106 in FIG. 8 will be described in detail with reference to FIG. 9. First, the apparatus determination processing unit 125 of the apparatus determining unit 12 receives a determination request of a setting apparatus (S121). The determination request of a setting apparatus includes, as described above, parameters (for example, a user ID, a tunnel type, a setting amount, an apparatus ID or an IP address of the transfer apparatus 40 as a setting candidate of a tunnel, network information of a connection destination, and the like) included in the setting order of a tunnel.

After S121, the apparatus determination processing unit 125 acquires apparatus information of the transfer apparatuses 40 as setting candidates of a tunnel included in parameters of the determination request of a setting apparatus from the apparatus information DB 124 (S122). Subsequently, with respect to each transfer apparatus 40 being a setting candidate of a tunnel, the apparatus determination processing unit 125 determines whether or not each transfer apparatus 40 is applicable to the tunnel of the type indicated by the parameters (S123: whether or not type of tunnel is applicable) and determines whether or not there are free resources (S124) based on the acquired apparatus information.

For example, the apparatus determination processing unit 125 selects one transfer apparatus 40 as a tunnel setting candidate, and determines whether or not the transfer apparatus 40 is applicable to the type of tunnel indicated in the parameters described above (S123: whether or not type of tunnel is applicable) and whether or not there is free resource (S124). Subsequently, when there is a transfer apparatus 40 that is an unselected setting candidate (S125: whether or not there are other candidates→Yes), the apparatus determination processing unit 125 executes processing of S123 and S124 with respect to the transfer apparatus 40 being an apparatus of the unselected setting candidate.

On the other hand, when there is no transfer apparatus 40 that is an unselected setting candidate (S125: whether or not there are other candidates→No), the apparatus determination processing unit 125 determines whether or not there is a transfer apparatus 40 satisfying the requirement indicated by the parameters described above (S126). At this point, when the apparatus determination processing unit 125 determines that there is no transfer apparatus 40 satisfying the requirement (S126→No), "not available" is returned to the setting processing unit 115 (S137).

On the other hand, when it is determined that there is a transfer apparatus 40 (candidate apparatus) satisfying the requirement indicated by the parameters described above (S126→Yes), the apparatus determination processing unit 125 requests information indicating the communication state of the candidate apparatus to the real-time information acquiring unit 123 (S131: Information request).

After S131, when there is information indicating the communication state of the candidate apparatus in the real-time information DB 20 (S132: whether or not there is information in DB→Yes), the real-time information acquiring unit 123 outputs the information to the apparatus determination processing unit 125. Accordingly, the apparatus determination processing unit 125 receives information indicating the communication state of the candidate apparatus (S134).

On the other hand, when information indicating the communication state of the candidate apparatus is not present in the real-time information DB 20 (S132: whether or not there is information in DB→No), the real-time information acquiring unit 123 requests the external information collection system 30 to acquire the information (S133). Subsequently, when the real-time information acquiring unit 123 acquires the information from the external information collection system 30, the real-time information acquiring unit 123 outputs the information to the apparatus determination processing unit 125. Accordingly, the apparatus determination processing unit 125 receives information indicating the communication state of the candidate apparatus (S134).

After S134, the apparatus determination processing unit 125 compares the information received in S134 with the user requirement in order to determine whether there is a candidate apparatus satisfying the user requirement (S135). When the apparatus determination processing unit 125 determines that there is a candidate apparatus satisfying the user requirement (S135→Yes), apparatus information (for example, an apparatus ID, an IP address or the like) of the candidate apparatus satisfying the user requirement is returned to the setting processing unit 115 (S136).

On the other hand, when the apparatus determination processing unit 125 determines that there is no candidate apparatus satisfying the user requirement (S135→No), "not available" is returned to the setting processing unit 115 (S137).

Figure 10:
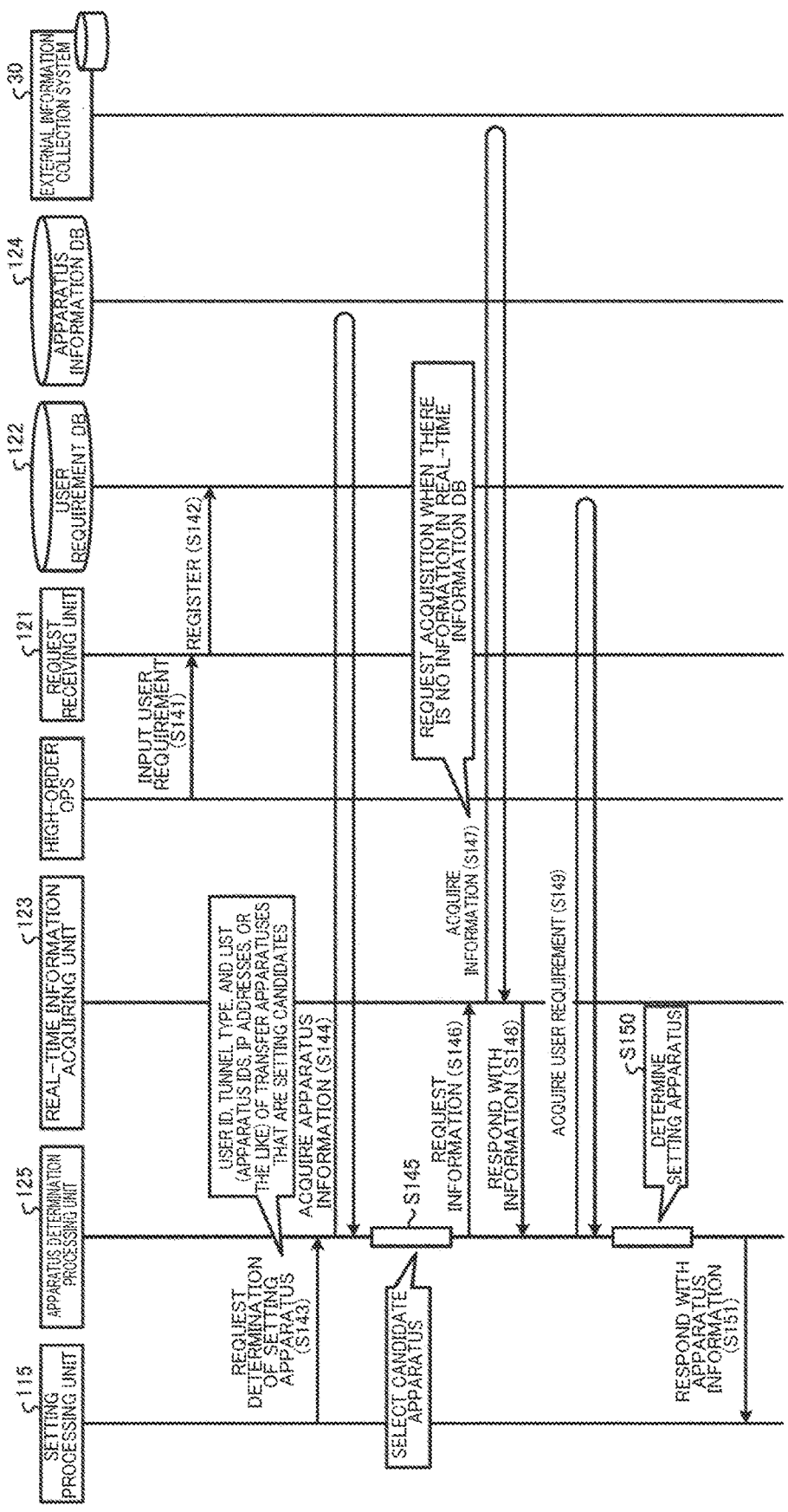
FIG. 10 is a sequence diagram showing an example of a processing procedure of the controller shown in FIG. 2.

Next, an example of the processing procedure of the apparatus determining unit 12 will be described with reference to the sequence diagram shown in FIG. 10. For example, when the requirement receiving unit 121 of the apparatus determining unit 12 receives input of a user requirement from a high-order Ops (S141), the requirement receiving unit 121 registers the user requirement in the user requirement DB 122 (S142).

After S142, the apparatus determination processing unit 125 receives a determination request of a tunnel setting apparatus from the setting processing unit 115 (S143). As described earlier, the determination request of a setting apparatus includes parameters included in the setting order (for example, a user ID, a tunnel type, and a list (apparatus IDs, IP addresses, or the like) of the transfer apparatuses 40 that are tunnel setting candidates).

After S143, the apparatus determination processing unit 125 acquires apparatus information of the transfer apparatuses 40 that are setting candidates included in the parameters described above from the apparatus information DB 124 (S144). Subsequently, the apparatus determination processing unit 125 selects a candidate apparatus using the apparatus information acquired in S144 (S145).

For example, based on the apparatus information acquired in S144, the apparatus determination processing unit 125 selects, as a candidate apparatus, the transfer apparatus 40 which is applicable to the tunnel type indicated by the parameters described above and which has free resources from the transfer apparatuses 40 that are setting candidates.

After S145, the apparatus determination processing unit 125 requests information indicating the communication state of the candidate apparatus selected in S145 to the real-time information acquiring unit 123 (S146: Information request). Subsequently, the real-time information acquiring unit 123 acquires information indicating the communication state of the candidate apparatus based on the request (S147). For example, the real-time information acquiring unit 123 first retrieves information indicating the communication state of the candidate apparatus from the real-time information DB 20. When the information is not present in the real-time information DB 20, the real-time information acquiring unit 123 requests the external information collection system 30 to acquire information indicating the communication state of the candidate apparatus and acquires information indicating the communication state of the candidate apparatus.

After S147, the real-time information acquiring unit 123 responds to the apparatus determination processing unit 125 with the information (S148). For example, the real-time information acquiring unit 123 outputs information indicating the communication state of the candidate apparatus acquired in S147 to the apparatus determination processing unit 125.

After S148, the apparatus determination processing unit 125 acquires a user requirement corresponding to the user ID included in the parameters described above from the user requirement DB 122 (S149). Subsequently, the apparatus determination processing unit 125 compares the response (information indicating the communication state of the candidate apparatus) obtained in S148 with the user requirement acquired in S149 and determines a candidate apparatus satisfying the user requirement as a setting apparatus (S150: Determination of setting apparatus). Subsequently, the apparatus determination processing unit 125 responds to the setting processing unit 115 with apparatus information of the setting apparatus determined in S150 (S151).

Figure 11:
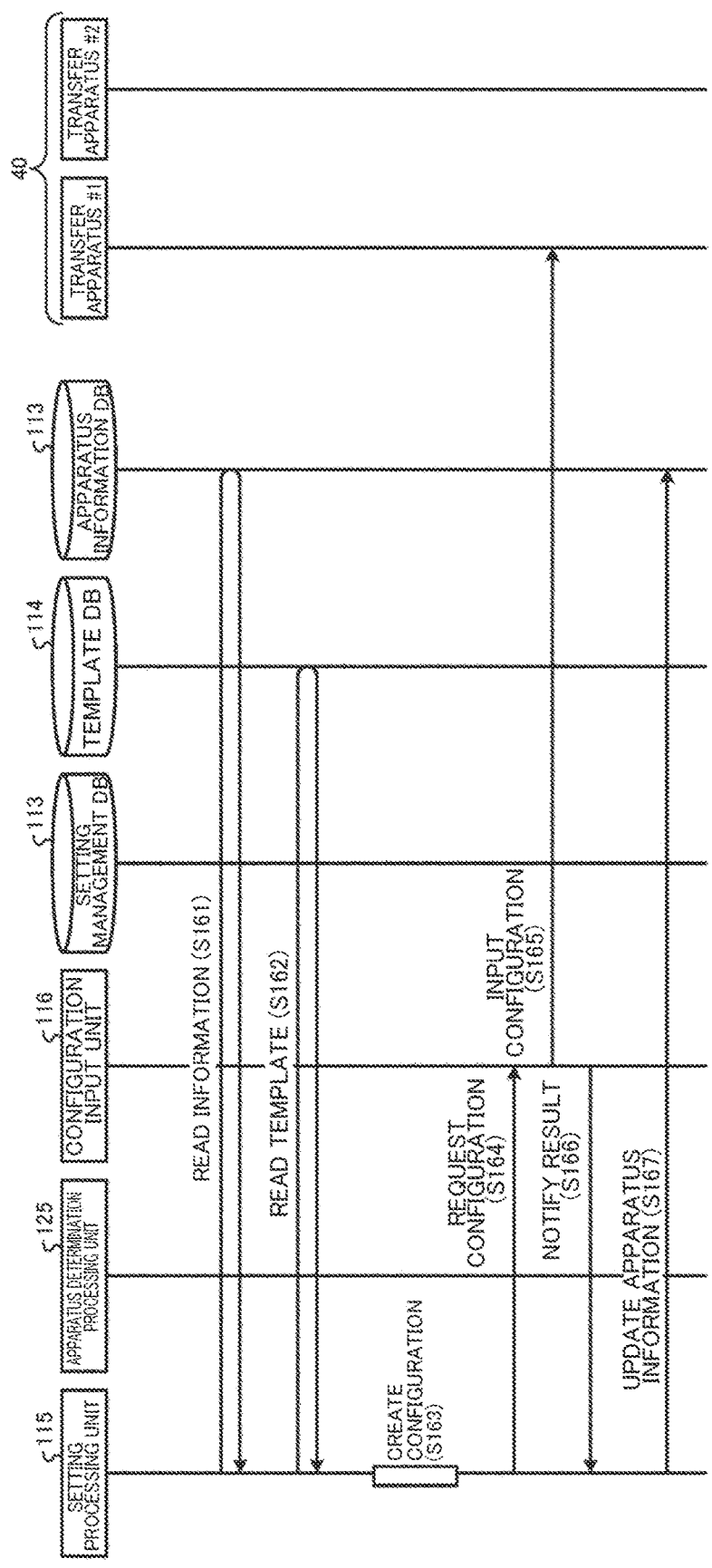
FIG. 11 is a sequence diagram showing an example of a processing procedure of the controller shown in FIG. 2.

Next, processing after the setting processing unit 115 receives a response of apparatus information of a setting apparatus in S151 in FIG. 10 will be described with reference to the sequence diagram shown in FIG. 11.

Based on the apparatus information of the setting apparatus (for example, an apparatus ID, an IP address, or the like of the setting apparatus) received from the apparatus determination processing unit 125, the setting processing unit 115 reads apparatus information (for example, information on a model, an OS, or the like of the setting apparatus) of the setting apparatus from the apparatus information DB 124 (S161). Next, the setting processing unit 115 reads a template from the template DB 114 (S162). Subsequently, the setting processing unit 115 creates a configuration to be input to the setting apparatus by reflecting each setting processing step stored in the setting management DB 113 and the apparatus information of the setting apparatus read in S161 on the template read in S162 (S163).

After S163, the setting processing unit 115 requests the configuration input unit 116 to input the configuration created in S163 (S164: Configuration request). Subsequently, based on the input request, the configuration input unit 116 inputs the configuration created in S163 to the transfer apparatus 40 (for example, a transfer apparatus #1) that is a configuration setting apparatus (S165: Configuration input). Subsequently, when the setting processing unit 115 the configuration input unit 116 receive a result notification of the input of the configuration (S166), the setting processing unit 115 the configuration input unit 116 update the apparatus information in the apparatus information DB 124 based on the result notification (S167). For example, the setting processing unit 115 updates a value of a consumed resource in the apparatus information (refer to FIG. 7) related to the transfer apparatus 40 at an input destination of the configuration.

According to the controller 10 described above, since a setting order of a tunnel is divided into a plurality of setting processing steps and a configuration is created using templates, the configuration can be readily created. In addition, the controller 10 stores the divided setting processing steps in the setting management DB 113 in, for example, a tree structure. Accordingly, a configuration can be more readily managed, partially modified, or expanded.

Furthermore, the controller 10 uses a communication state among the respective transfer apparatuses 40 to determine a transfer apparatus 40 satisfying a communication requirement of a user as an input destination of the configuration. Accordingly, the controller 10 can flexibly determine the transfer apparatus 40 at a setting destination of a tunnel according to the communication state among the transfer apparatuses 40.

[System Configuration and the Like]

Each component of each illustrated unit is a functional conceptual component and does not necessarily need to be physically configured as illustrated in the drawings. In other words, a specific form of distribution and integration of the respective apparatuses is not limited to the form illustrated in the drawings, and all or some of the apparatuses can be distributed or integrated functionally or physically in any units according to various loads, use situations, and the like. Furthermore, all or some of processing functions to be performed in each apparatus can be realized by a CPU and a program executed by the CPU, or can be realized as hardware using a wired logic.

In addition, among processing described in the embodiment presented above, all or a part of processing described as being automatically performed can be manually performed or, alternatively, all or a part of processing described as being manually performed can be automatically performed according to known methods. Furthermore, information including processing procedures, control procedures, specific names, various data and parameters that are described above or shown in the drawings may be arbitrarily changed unless otherwise described.

[Program]

The controller 10 described earlier can be implemented by installing a program in a desired computer as packaged software or on-line software. For example, an information processing apparatus can be caused to function as the controller 10 by having the information processing apparatus execute the program described above. An "information processing apparatus" as used herein includes a desktop or laptop personal computer. Furthermore, information processing apparatuses also include a mobile communication terminal such as a smart phone, a mobile phone, or a PHS (Personal Handyphone System), a terminal such as a PDA (Personal Digital Assistant), and the like.

In addition, with a terminal apparatus used by a user considered a client, the controller 10 can be implemented as a server apparatus for providing the client with service related to the processing described above. In this case, the server apparatus may be implemented as a Web server or may be implemented as a cloud for providing service related to the processing described above by outsourcing.

Figure 12:
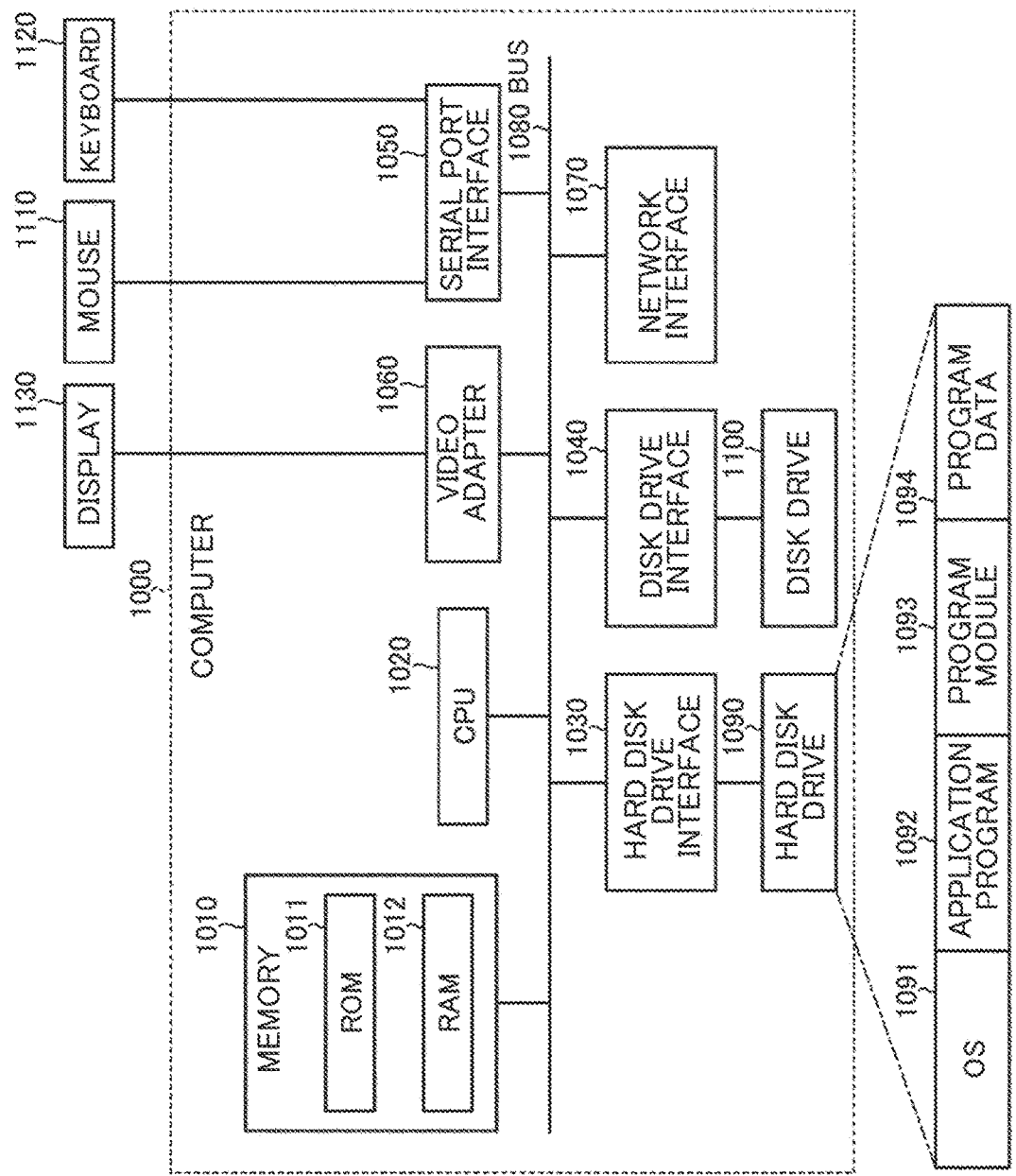
FIG. 12 is a diagram showing a configuration example of a computer that executes a configuration input program.

FIG. 12 is a diagram showing an example of a computer that executes a configuration input program. For example, a computer 1000 includes a memory 1010 and a CPU 1020. The computer 1000 also includes a hard disk drive interface 1030, a disk drive interface 1040, a serial port interface 1050, a video adapter 1060, and a network interface 1070. Each of these units is connected by a bus 1080.

The memory 1010 includes a ROM (Read Only Memory) 1011 and a RAM (Random Access Memory) 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. In other words, a program defining each processing step of the controller 10 described above is implemented as the program module 1093 which describes a code that can be executed by the computer. The program module 1093 is stored in, for example, the hard disk drive 1090. For example, the program module 1093 for executing similar processing as the functional components in the controller 10 is stored in the hard disk drive 1090. The hard disk drive 1090 may be replaced with an SSD (Solid State Drive).

In addition, data used in the processing in each embodiment described above is stored in, for example, the memory 1010 or the hard disk drive 1090 as the program data 1094. Subsequently, the CPU 1020 reads the program module 1093 or the program data 1094 stored in the memory 1010 or the hard disk drive 1090 into the RAM 1012 and executes the same as necessary.

The program module 1093 or the program data 1094 is not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network (a LAN (Local Area Network), a WAN (Wide Area Network), or the like). In addition, the program module 1093 and the program data 1094 may be read out from the other computer via the network interface 1070 by the CPU 1020.

REFERENCE SIGNS LIST

1 System
10 Controller
11 Setting unit
12 Apparatus determining unit
20 Real-time information DB
30 External information collection system
40 Transfer apparatus
111 Order receiving unit
112 Order dividing unit
113 Setting management DB
114 Template DB
115 Setting processing unit
116 Configuration input unit
121 Requirement receiving unit
122 User requirement DB
123 Real-time information acquiring unit
124 Apparatus information DB

The invention claimed is:

1. A configuration input apparatus, comprising:
a processor; and
a memory device storing instructions that, when executed by the processor, configure the processor to:
receive a setting order of a tunnel;
divide the setting order of the tunnel into a first setting processing step related to setting registration of a user, a second setting processing step related to a transfer surface of the tunnel, a third setting processing step related to an interface of each transfer apparatus used for the tunnel of the transfer surface, and a fourth setting processing step related to a parameter to be set to the interface and which stores the divided setting processing steps in a storage unit;
create a configuration for executing setting processing of the tunnel as indicated in the setting order by reflecting information indicated in each setting processing step on a template prepared for each setting processing step; and input the configuration to a transfer apparatus at a setting destination of the tunnel.

2. The configuration input apparatus according to claim 1, the processor is further configured to:
determine, based on identification information of the user of the tunnel, transfer apparatuses of setting candidates of the tunnel, and information indicating a communication state among the respective transfer apparatuses included in the setting order of the tunnel, a transfer apparatus satisfying a communication requirement of the user among the transfer apparatuses of setting candidates of the tunnel as a transfer apparatus at the setting destination of the tunnel,
wherein the processor is configured to create the configuration to be input to the determined transfer apparatus at the setting destination of the tunnel.

3. The configuration input apparatus according to claim 1, wherein
the processor is configured to make the divided setting processing steps into a tree structure and stores the tree structure in the storage unit.

4. The configuration input apparatus according to claim 2, wherein
the communication requirement of the user includes at least one of a delay time and a communication band allowed in communication using the tunnel of the user.

5. A configuration input method executed by a configuration input apparatus, the configuration input method comprising:
receiving a setting order of a tunnel;
dividing the setting order of the tunnel into a first setting processing step related to setting registration of a user, a second setting processing step related to a transfer surface of the tunnel, a third setting processing step related to an interface of each transfer apparatus used for the tunnel of the transfer surface, and a fourth setting processing step related to a parameter to be set to the interface and storing the divided setting processing steps in a storage unit;
creating a configuration for executing setting processing of the tunnel as indicated in the setting order by reflecting information indicated in each setting processing step on a template prepared for each setting processing step; and
inputting the configuration to a transfer apparatus at a setting destination of the tunnel.

6. A non-transitory computer readable medium storing a program, wherein executing of the program causes a computer to execute operations comprising:
receiving a setting order of a tunnel;
dividing the setting order of the tunnel into a first setting processing step related to setting registration of a user, a second setting processing step related to a transfer surface of the tunnel, a third setting processing step related to an interface of each transfer apparatus used for the tunnel of the transfer surface, and a fourth setting processing step related to a parameter to be set to the interface and storing the divided setting processing steps in a storage unit;
creating a configuration for executing setting processing of the tunnel as indicated in the setting order by reflecting information indicated in each setting processing step on a template prepared for each setting processing step; and
inputting the configuration to a transfer apparatus at a setting destination of the tunnel.

* * * * *